United States Patent [19]

Oguchi et al.

[11] Patent Number: 5,661,352
[45] Date of Patent: Aug. 26, 1997

[54] CONNECTOR-EQUIPPED SPINDLE MOTOR

[75] Inventors: Norikazu Oguchi; Osamu Wada, both of Komagane; Tadahiro Tanaka, Ina, all of Japan

[73] Assignee: Nidec Corporation, Kyoto, Japan

[21] Appl. No.: 381,126

[22] Filed: Jan. 31, 1995

[30] Foreign Application Priority Data

| Feb. 7, 1994 | [JP] | Japan | 6-035324 |
| Feb. 7, 1994 | [JP] | Japan | 6-035326 |
| Feb. 28, 1994 | [JP] | Japan | 6-055290 |

[51] Int. Cl.[6] .................................................. H02K 11/00
[52] U.S. Cl. ................................................. 310/71; 310/156
[58] Field of Search .................................... 310/71, 156

[56] References Cited

U.S. PATENT DOCUMENTS

| 3,602,748 | 8/1971 | Locke | 310/71 |
| 4,104,484 | 8/1978 | Ijlstra et al. | 310/71 |
| 4,626,721 | 12/1986 | Ouchi | 310/71 |
| 5,061,868 | 10/1991 | Iwazaki et al. | 310/67 R |
| 5,064,377 | 11/1991 | Wood | 439/67 |
| 5,177,650 | 1/1993 | Jabbari et al. | 360/99.08 |
| 5,214,326 | 5/1993 | Yonei | 310/67 R |
| 5,256,922 | 10/1993 | Tanaka et al. | 310/71 |
| 5,281,886 | 1/1994 | Ohta | 310/90 |
| 5,313,129 | 5/1994 | Stewart | 310/90 |
| 5,347,189 | 9/1994 | Chuta et al. | 310/90 |
| 5,402,023 | 3/1995 | Nakanishi et al. | 310/90 |
| 5,442,248 | 8/1995 | Agnoff | 310/71 |

*Primary Examiner*—Thomas M. Dougherty
*Attorney, Agent, or Firm*—McCormick, Paulding & Huber

[57] ABSTRACT

A spindle motor has a stationary shaft, a rotor hub rotatably supported by the stationary shaft via a bearing, a loop-like rotor magnet attached to the internal surface of the rotor hub, and a stator disposed to opposedly face the rotor magnet. The stationary shaft has an opening at its base end. A connector is fit into the opening, and a wire lead drawn from a coil of the stator is electrically connected to the connector. The connector is detachably coupled to a mating connector of an external unit. Through these connectors, the power is supplied to the coil from the external unit.

10 Claims, 7 Drawing Sheets

CONNECTOR-EQUIPPED SPINDLE MOTOR

BACKGROUND OF THE INVENTION

1. Field of the Invention

The present invention relates to a spindle motor which is mainly used for rotating a disk (a magnetic disk, an optical disk, or the like). More particularly, the invention relates to an improvement in a spindle motor which uses a connector for connecting a stator coil to a power supply.

2. Description of the Related Art

Generally, a spindle motor for driving a recording member, such as a magnetic disk, an optical disk, or the like, comprises: a stationary member, such as a base of a disk drive, brackets fixed to the base, and the like; a rotor rotatably supported by the stationary member via a bearing; a rotor magnet attached to the rotor; and a stator arranged around the stationary member so as to face the rotor magnet. A recording disk is fit around the rotor as required.

In the spindle motor of this type, a coil lead drawn from the stator is connected to a control circuit of a disk drive by the following exemplary method. As disclosed in the U.S. Pat. No. 5,281,886, a through-hole is first provided for a stationary shaft to have the stator fixed therearound. A coil lead drawn from the stator passes through this hole and is led to the exterior of the shaft. Then, the forward end of the coil lead is connected to the control circuit.

However, the spindle motor as described above presents a problem in that the connecting operation of the coil lead to the control circuit cannot be performed only in the motor unit. That is, the following series of operations are required for this connection. It is necessary that the assembly of the motor unit be completed in the state in which the coil lead is led from the through-hole of the shaft. After this motor unit is built into the disk drive, the lead is guided to the control circuit of the disk drive, and the forward end of the lead is connected to a predetermined terminal of the control circuit. Hence, the spindle motor of the above type suffers from poor workability of the connecting operation of the lead to the disk drive.

SUMMARY OF THE INVENTION

Accordingly, in order to solve the above problems, an object of the present invention is to provide a spindle motor in which the connecting operation of a coil lead drawn from a stator can be performed only in the motor unit.

Another object of the present invention is to provide a spindle motor in which a coil lead can be connected to a control circuit of a disk drive, or the like, simultaneously with building the motor into the disk drive.

Other objects and features of the invention will be apparent more fully from the following description.

DESCRIPTION OF THE PREFERRED EMBODIMENTS

Figure 1:
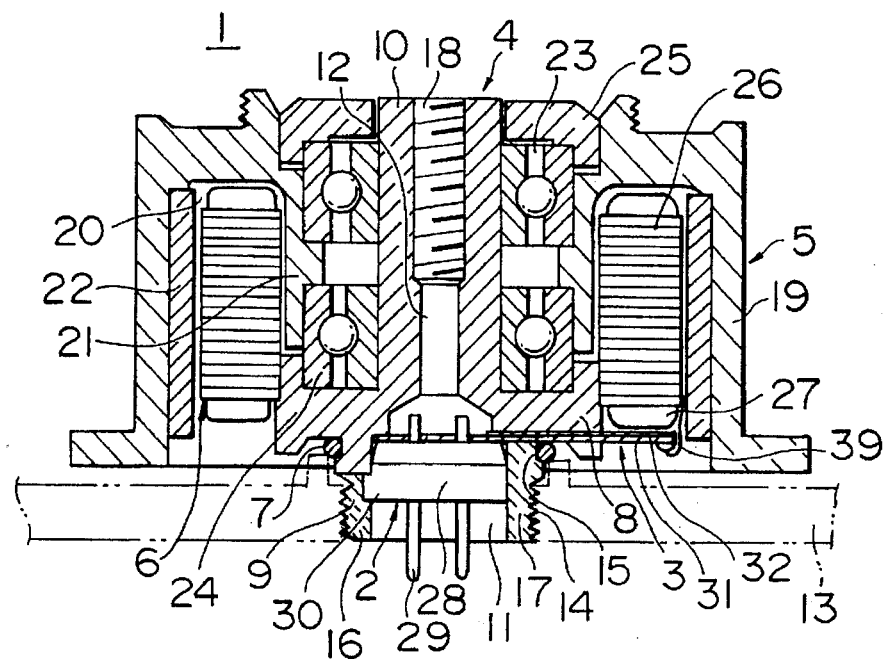
FIG. 1 is a cross sectional view of a first embodiment of a spindle motor according to the present invention.

The present invention will now be described in details with reference to the accompanying drawings.

A first embodiment of a spindle motor of the present invention will be explained with reference to FIGS. 1–4.

A spindle motor 1 shown in FIGS. 1–4 largely comprises a center shaft 4, a rotor hub 5, a stator 6, a motor connector 2, a flexible circuit printed board 3, and an O ring 7, as well as other components.

Figure 2:
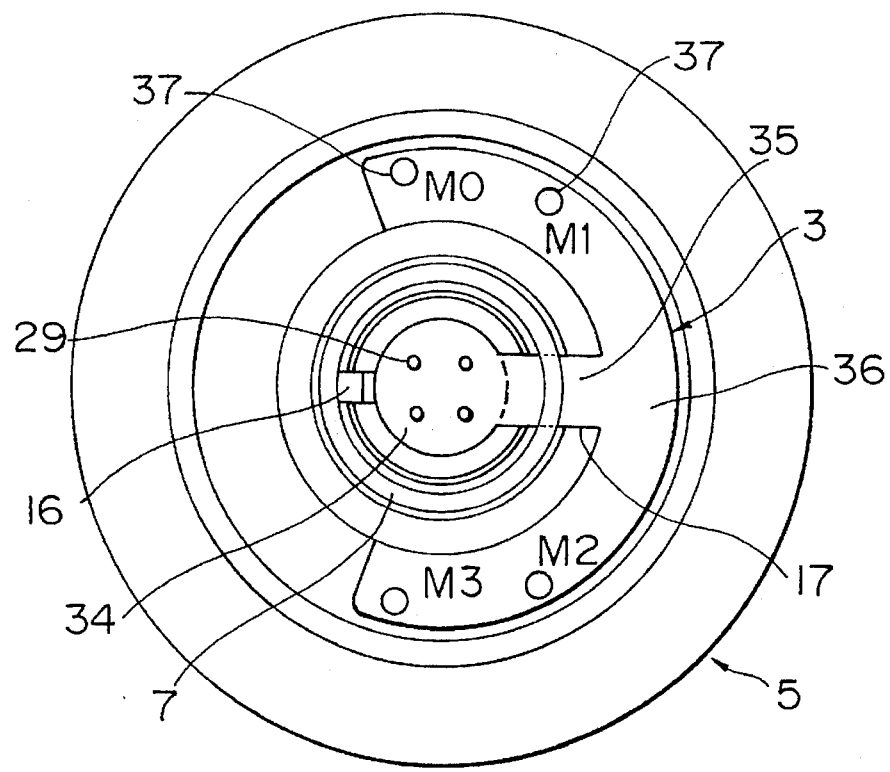
FIG. 2 illustrates the bottom surface of the spindle motor shown in FIG. 1.

The center shaft 4 is formed of a disk-like base unit 8, a mounting portion 9 protecting from one end (downward in FIG. 1) of the base unit 8, and a projecting shaft 10 projecting from the other end (upward in FIG. 1) of the base unit 8. Provided within the mounting portion 9 is an inner hole 11 which is opened downward for accommodating the connector 2 and which upper portion is communicated with a through-hole 12 provided for the projecting shaft 10. A screw 14 is formed around the outer periphery of the mounting portion 9, thereby screwing the mounting portion 9 to a base 13 of a disk drive by way of a nut (not shown). A groove 15 for receiving the O ring 7 therein is formed at the root of the screw 14 which is interconnected to the base unit 8. As shown in FIG. 2, a key way 16 and a notch 17 are formed on part of the circumference of the mounting portion 9 so as to radially cut the mounting portion 9. Another key way 16 is formed on the bottom surface of the base unit 8. A mounting screw hole 18 is provided above the through-hole 12 provided for the projecting shaft 10.

The rotor hub 5 is formed of a rotator which integrally forms an outer wall 19 and an inner wall 21. The outer periphery of the outer wall 19 is configured to match a magnetic disk (not shown), or the like, which is attached thereto, while the inner wall 21 is integrally formed with the outer wall 18 via a space 20 so as to be placed toward the center shaft 4. A rotor magnet 22 is fixed to the internal surface of the outer wall 19. An upper bearing 23 and a lower bearing 24 are allowed to intervene between the inner wall 21 and the projecting shaft 10 of the center shaft 4. With this arrangement, the rotor hub 5 is supported by the center shaft 4. As illustrated in FIG. 1, a bearing cover 25 fit into the upper portion of the projecting shaft 10 is disposed on the upper bearing 23. The internal surface of this bearing cover 25, together with the external surface of the projecting shaft 10, form a labyrinth structure, thereby preventing the entry of dust and dirt from the motor.

The stator 6 is formed of a coil 26 and a stator core 27 for winding the coil 26 therearound, and in this embodiment, the stator 6 is configured to form a three-phase motor. The stator core 27 is securely mounted on the base unit 8 of the center shaft 4 and is accommodated within the space 20 provided for the rotor hub 5.

Figure 4:
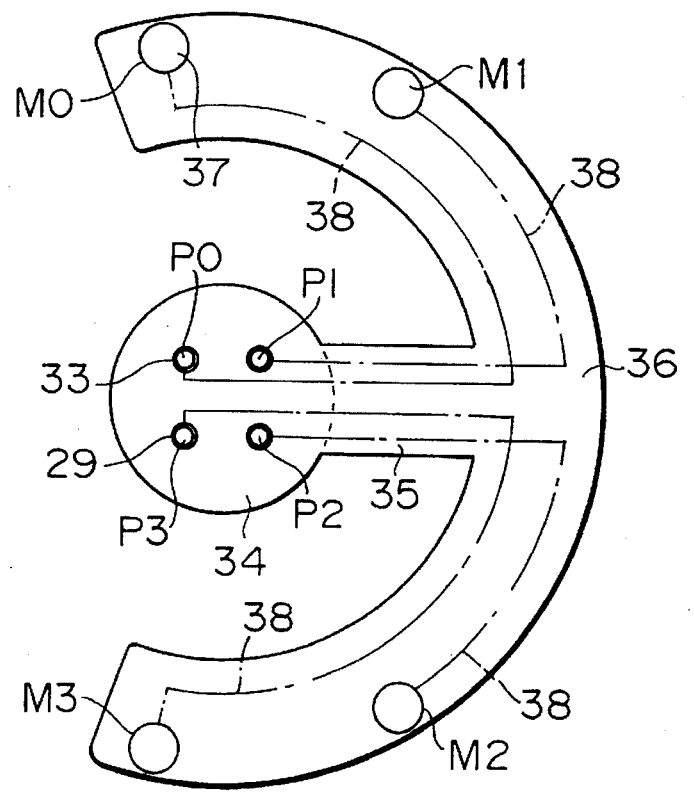
FIG. 4 illustrates the bottom surface of the connecting portion shown in FIG. 3.

In this embodiment, the connector 2 is formed of a connector body 28 and four pins 29 used for a three-phase motor (hereinafter referred to as pins $P_0$, $P_1$, $P_2$, $P_3$, as illustrated in FIGS. 2 and 4). The connector body 28 is configured so that it can be fit and removed into/from the inner hole 11 provided for the mounting portion 9 of the center shaft 4 and is also provided with a stopper 30 which is stopped by the key way 16.

Figure 3:
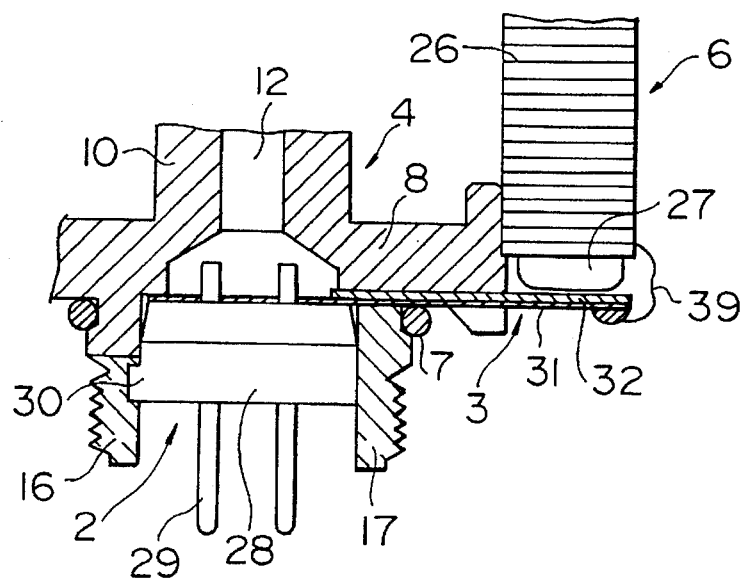
FIG. 3 is a cross sectional view of a connecting portion between a connector and a flexible circuit printed board of the spindle motor shown in FIG. 1.

As shown in FIGS. 3 and 4, the circuit printed board 3 is obtained by laminating a reinforcing plate 32 to a flexible printed board 31. As illustrated in FIG. 4, the printed board 31 has four mating holes 33 for receiving the pins $P_0$, $P_1$, $P_2$, $P_3$ provided adjacent to the upper end of the connector 2. It also has a disk-like plate 34 which is sized substantially similar to the connector body 28, a neck 35 which is fit into the notch 17 of the center shaft 4, and a circumferentially developed arch-like portion 36. Soldering portions 37 ($M_0$, $M_1$, $M_2$, $M_3$) corresponding to the pins $P_0$, $P_1$, $P_2$, $P_3$ are formed on the arch-like portion 36. Moreover, a circuit pattern 38 is formed between the soldering portions 37 and the mating holes 33 so as to allow both components to communicate therebetween so that the pins 29 ($P_0$, $P_1$, $P_2$, $P_3$) and the soldering portions 37 ($M_0$, $M_1$, $M_2$, $M_3$) can be in contact with each other. The reinforcing plate 32 is formed substantially in the same shape as the printed board 31 other than the disk-like plate 34. It is overlapped with the neck 35 and the arch-like portion 36 of the printed board 31 so as to reinforce and support them.

FIG. 3 shows the spindle motor 1 having the circuit printed board 3 being attached to the connector 2. As is shown in FIG. 3, the printed board 31 is horizontally arranged in such a way that the disk-like portion 34 of the printed board 31 is fit into the pins 29 of the connector 2, and the neck 35 is fit along the key way 16. The soldering portions 37 provided for the arch-like portion 36 are interconnected to the wire lead 39 from the coil 26 of the stator 6. The O ring 7 fit into the groove 15 of the mounting portion 9 is pressed to contact to the bottom surface of the printed board 31 so that it can press the entire printed board 3 to the base unit 8 so as to support it. In particular, when the motor is attached to the base 13 of the disk drive, the base 13 partially acts upon the O ring 7, thereby hermetically sealing the space between the base 13 and the flexible circuit printed board 3, and also acting upon the printed board 3 with great effect.

With the spindle motor 1 constructed as described above, the mounting portion 9 of the center shaft 4 is screwed into the base 13 by way of a nut (not shown), thereby fixing the motor 1 to the disk drive. Simultaneously, the pins 29 of the connector 2 are fit into the mating holes of a base connector (not shown). This electrically connects the coil 26 of the stator 6 to the control circuit of the disk drive via the motor connector 2 and the mating base connector. In consequence, this arrangement eliminates the necessity of drawing the coil 26 of the stator 6, as has been conventionally necessitated, thereby enhancing easy connecting operation, good handling, and simple assembly.

Figure 5:
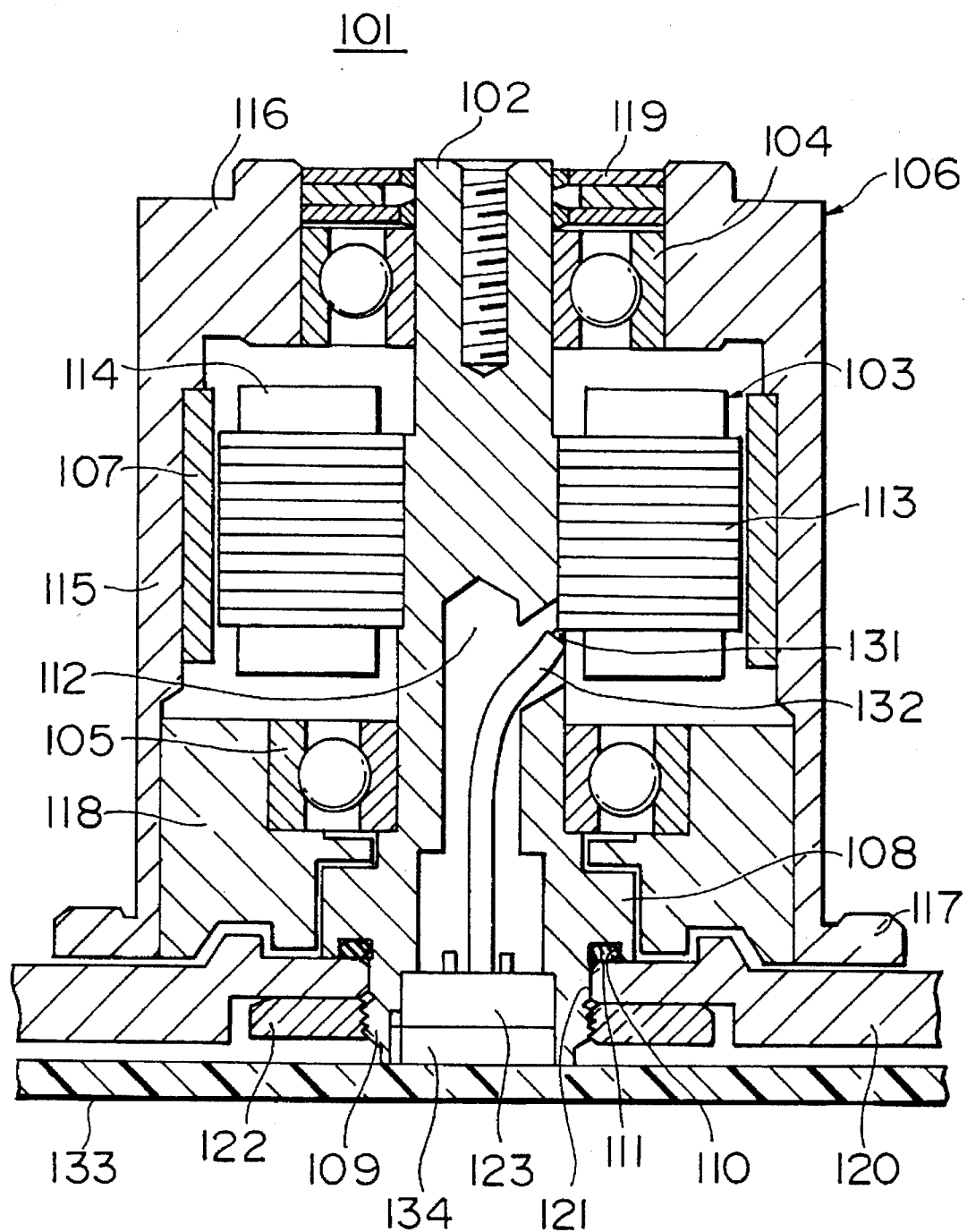
FIG. 5 is a cross sectional view of a second embodiment of a spindle motor according to the present invention.
Figure 6:
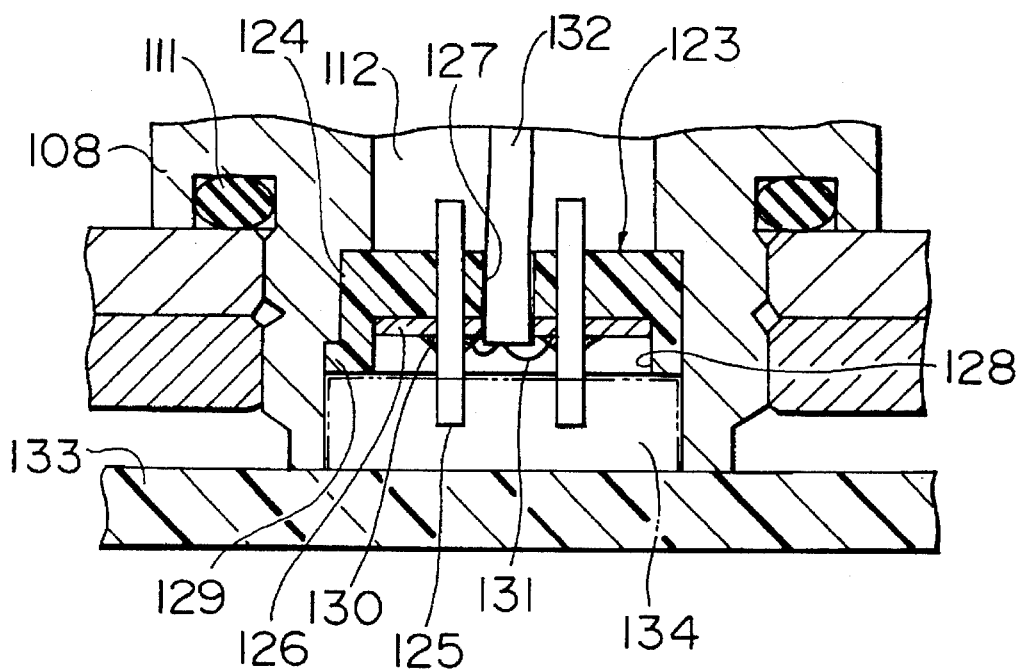
FIG. 6 is a cross sectional view of the connector of the spindle motor shown in FIG. 5.
Figure 7:
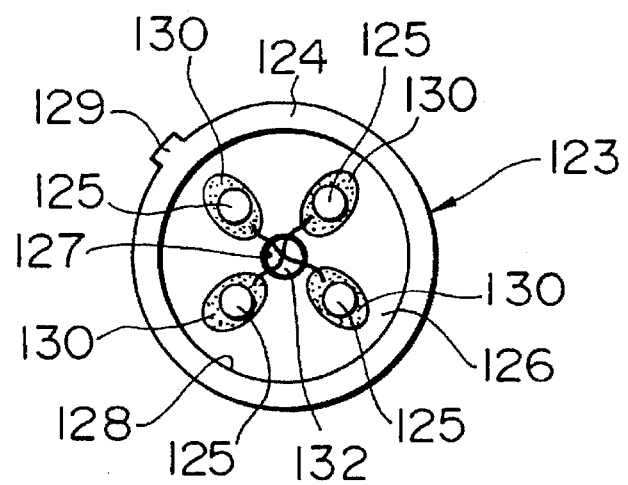
FIG. 7 illustrates the bottom surface of the connector shown in FIG. 6.

A description will now be given of a second embodiment of a spindle motor according to the present invention with reference to FIGS. 5–7.

A spindle motor 101 comprises: a stationary shaft 102; a stator 103 fixed around the central portion of the stationary shaft 102; a rotor hub 106 rotatably supported by the stationary shaft 102 through a pair of bearings 104 and 105; and a rotor magnet 107 attached to the internal surface of the rotor hub 106 so as to opposedly face the stator 103, as well as other components. An enlarged portion 108 is arranged at the bottom portion of the stationary shaft 102 so that it can specify the steps. A mounting portion 109 having a male screw formed therearound is further arranged at the bottom end projecting from the enlarged portion 108. Besides, a loop-like recess 110 is formed on the bottom surface (to be in contact with the top surface of a below-mentioned base member) which specifies the steps below the enlarged portion 108. A ring-like sealing member 111, for example, synthetic rubber, is fit into the loop-like recess 110. Provided for the stationary shaft 102 is a through-hole 112 axially extending from the bottom end to the middle portion of the shaft 102, which through-hole 112 is at one end opened downward of the motor and is at other end opened to correspond to the bottom end of the stator 103 within the motor. One end of the through-hole 112 is enlarged to receive a below-mentioned connector.

The stator 103 is formed of a stator core 114 and a coil 113 wound around the stator core 114. A pair of bearings 104 and 105 for the stationary shaft 102 are each arranged on and under the stator 103. The rotor hub 106 is formed of stainless steel, or the like, being generally in a cylindrical shape. The rotor hub 106 comprises: an enlarged portion 115 around which a recording disk is attached; a shoulder 116 forming the upper portion of the enlarged portion 115; and an outward collar 117 projecting outwardly from the bottom end of the enlarged portion 115. The upper bearing 104 intervenes between the stationary shaft 102 and the shoulder 116, while the lower bearing 105 intervenes between the stationary shaft 102 and the lower end of the enlarged portion 115 via a bearing holder 118. A magnetic fluid sealing device 119 is attached around the inner periphery of the upper end of the shoulder 116 so as to prevent the entry of dust from the bearing 104 or other components of the motor. On the other hand, a slight gap is formed between the internal surface of the bearing holder 118 and the external surface of the enlarged portion 108 so as to result in a labyrinth seal, which prevents the entry of dust from the bearing 105 or other components of the motor.

A motor-mounting hole 121 is provided for a base member 120 of a disk drive which has the spindle motor 101 mounted thereon. The mounting portion 109 of the stationary shaft 102 is inserted into the mounting hole 121, and a nut 122 is screwed to the mounting portion 109 introduced downward from the base member 120, thereby fixing the spindle motor 101 to the base member 120.

A male connector 123 is screwed into the opening at the bottom end of the through-hole 112. As shown in FIG. 6, this connector 123 comprises: a connector body 124 formed of an insulating resin; four pins 125 molded into the connector body 124; and a circuit printed board 126. The connector body 124 has a hole 127 axially at the center thereof, a recess groove 128 on the bottom surface thereof, and a locating and rotation-preventing projection 129 partially provided on the external wall on the bottom portion thereof. The circuit printed board 126 is formed in the recess groove 128. Lands 130 are arranged on the bottom surface of the printed board 126 so as to be placed to correspond to the respective pins 125. The depth of the recess groove 128 is so determined that soldering portions formed on the lands 130 of the printed board 126 keep out of the way from the bottom surface of the connector 123.

Four wire leads 131 are drawn from the coil 113 of the stator 103. The four wire leads 131 are inserted into the through-hole 112, while being covered with an insulating tube 132, and are each electrically connected at the forward end to each of the pins 125 of the connector 123. The forward end of the insulating tube 132 is directly led to the recess groove 128 via the hole 127 of the connector body 124. Accordingly, the wire leads 131 led from the insulating tube 132 are at the forward ends soldered to the lands 130 of the pins 125, respectively.

A control circuit board 133 of a disk drive is disposed downward of the base member 120. Mounted on this circuit board 133 is a female connector 134 to opposedly face the mounting hole 121 of the base member 120. After the spindle motor 101 is securely fixed to the upper portion of the base member 120, the circuit board 133 is mounted on the bottom surface of the base member 120 so as to allow the female connector 134 to fit into the enlarged portion 108 of the stationary shaft 102, thereby performing the mating of both connectors 123 and 134. Through this operation, the coil 113 is electrically connected to the control circuit board 133 through the wire leads 131 and the male and female connectors 123 and 134.

With the spindle motor 101 constructed as described above, the wire leads 131 drawn from the coil 113 of the stator 103 are connected to the male connector 123 attached to the lower end of the stationary shaft 102, and this connector 123 is further mated to the female connector 134 provided for the disk drive, thereby performing electrical wiring between the coil 113 and the circuit board 133. This remarkably simplifies the wiring operation over the conventional operations employed whereby the spindle motor 101 is built into a disk drive in the state in which the wire leads 131 from the coil 113 are drawn to the exterior of the motor, thereby resulting in an improvement in the connecting operation.

In particular, the second embodiment is constructed in such a way that the recess groove 128 is arranged on the bottom surface of the connector 123 so as to form the hole 127 therein, and the wire leads 131 passing through the through-hole 112 are led from the connector 123 so as to be soldered to the respective pins 125. Consequently, the wire leads 131 can be easily connected from the exterior to the connector 123 which has been fit into the stationary shaft 102, thereby enhancing the connecting operation. For performing this operation, the depth of the recess groove 128 should be made greater than the height of the soldering portions so that the soldering portions can be kept out of the way when the female connector 134 is mated to the male connector 123, thereby preventing impairment of the reliability of the connector mating.

A third embodiment of a spindle motor according to the present invention will now be described with reference to FIGS. 8 and 9.

Figure 8:
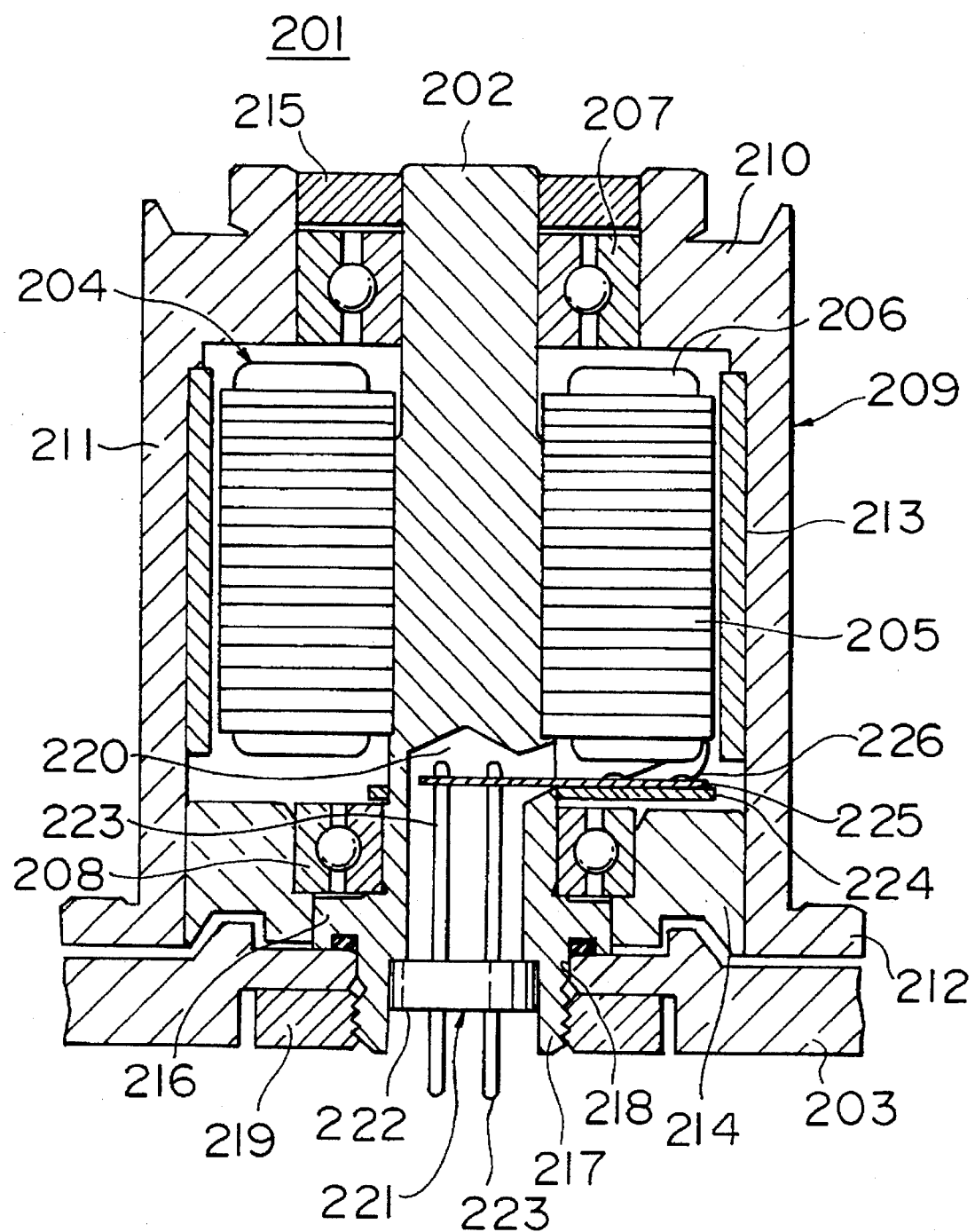
FIG. 8 is cross sectional view of a third embodiment of a spindle motor according to the present invention.
Figure 9:
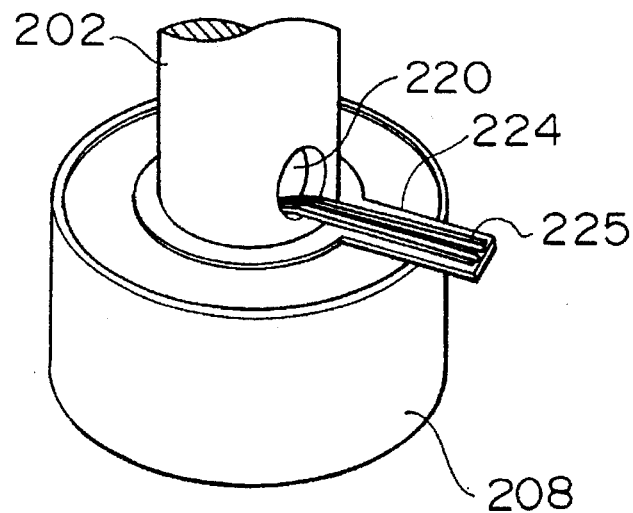
FIG. 9 is a perspective view of a connecting portion between a reinforcing plate and a flexible circuit printed board of the spindle motor shown in FIG. 8.

A spindle motor 201 shown in FIG. 8 is constructed as follows. A stationary shaft 202 is mounted on a base member 203 of a disk drive. A stator 204 fixed around the middle portion of the stationary shaft 202 includes a stator core 206 formed of a silicon steel plate and a coil 205 wound around the stator core 206. A rotor hub 209 is supported by the stationary shaft 202 by way of a pair of bearings 207 and 208. It comprises at its upper end of the internal portion a projection 210 for supporting the bearing 207 and at its outer peripheral portion a peripheral wall 211 for having a recording disk attached thereto. An outward collar 212 for supporting the disk projects outward from the bottom end of the peripheral wall 211 of the rotor hub 209. A loop-like rotor magnet 213 is fixed on the internal surface of the peripheral wall 211 of the rotor hub 209 so as to opposedly face the stator 204. The rotor hub 209 is supported at its opened end by the bearing 208 via a bearing bush 214. A loop-like labyrinth cap 215 is securely formed on the internal surface of the upper end of the projection 210 of the rotor hub 209. A slight gap is formed between the internal surface of the labyrinth cap 215 and the external surface of the upper end of the stationary shaft 202 so as to result in a labyrinth seal.

A flange-like enlarged portion 216 is disposed at the bottom of the stationary shaft 202, and a mounting portion 217 having a male screw formed therearound is further provided for the bottom of the enlarged portion 216. This mounting portion 217 is inserted into and past a mating hole 218 provided for the base member 203, and a nut 219 is screwed to the mounting portion 217, thereby securing the stationary shaft 202 onto the base member 203.

The stationary shaft 202 is provided with a through-hole 220 axially extending from the bottom end to the position corresponding to the bottom surface of the stator 204. The through-hole 220 is at one end opened downward of the motor and at its other end opened to the peripheral surface of the stationary shaft 202. It is formed in such a way that the portion corresponding to the mounting portion 217 is slightly enlarged to receive a male connector 221 therein. This connector 221 is formed of an insulating disk-like connector body 222 and four conductive pins 223 integrally molded with the connector body 222. The top ends of the pins 223 extend in the vicinity of the top end of the through-hole 220.

A reinforcing plate 224 placed immediately below the stator 204 is secured around the stationary shaft 202. A flexible circuit printed board 225 is further mounted on the reinforcing plate 224. As shown in FIG. 9, the circuit board 225 is formed in a band-like shape, and is soldered at one end to the upper ends of the pins 223 of the connector 221 and is supported at its other end by the reinforcing plate 224. Four wire leads 226 drawn from the coil 205 of the stator 204 are soldered to the end of the flexible circuit board 225 supported by the reinforcing plate 224. Through this circuit board 225, the four wire leads 226 are electrically connected to the respective pins 223 of the connector 221. After the stationary shaft 202 of the spindle motor 201 is mounted on the base member 203 of the disk drive, a female connector (not shown) connected to the control circuit of the disk drive is fit into the through-hole 220 of the stationary shaft 202 from below, thereby achieving the mating of the female connector to the male connector 221 placed within the through-hole 220. Consequently, the coil 205 is connected to the control circuit via the wire leads 226, the flexible circuit printed board 225, the male connector 221 and the female connector.

The assembly method for performing the electrical coil connection in the spindle motor 201 is employed by the following procedure.

The connector 221 has been soldered to the flexible circuit printed board 225. The bearing 208 is fit around the lower portion of the stationary shaft 202, and the bush 214 is further fit around the bearing 208. Then, the reinforcing plate 224 is bonded around the stationary shaft 202. The printed board 225 is inserted into the through-hole 220 from one end from below and is led from the peripheral wall of the stationary shaft 202, and the connector 221 is accordingly fit into the through-hole 220. Subsequently, the printed board 225 is bonded to the reinforcing plate 224. Then, the stator 204 is fit around the stationary shaft 202, and the four wire leads 226 are soldered to the circuit board 225.

The printed board 225 is allowed to intervene between the coil 205 and the connector 221 as described above, thereby enhancing the workability of the connecting operation and also ensuring insulation properties between the wire leads 226 and the internal surface of the through-hole 220.

Figure 10:
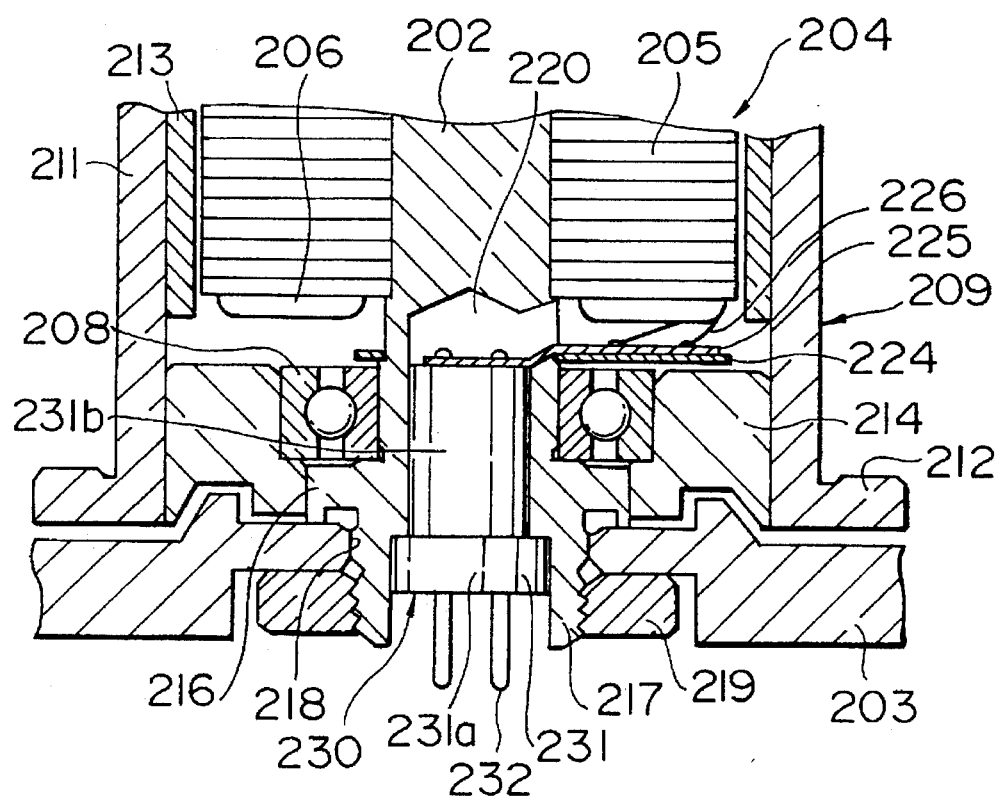
FIG. 10 is a cross sectional view of the essential portion of a fourth embodiment of the spindle motor according to the present invention.

FIG. 10 illustrates an example of modifications of the connector of the spindle motor shown in FIG. 8. A connector 230 is formed of an insulating connector body 231 and four conductive pins 232 molded into the connector body 231. The top ends of the pins 232 are extended in the vicinity of the upper end of the through-hole 220. The connector body 231 comprises: a disk-like portion 231a fit into the mounting portion 217 placed at the bottom end of the stationary shaft 202; and a cylindrical portion 231b extending in the vicinity of the top ends of the pins 232 from the disk-like portion 231a. The cylindrical portion 231b is fit into the through-hole 220 at great depths. The printed board 225 connected to the wire leads 226 of the coil 205 is directly supported at one end by the top surface of the cylindrical portion 231b of the connector body 231. The pins 232 are soldered to the printed board 225 on the top surface of the cylindrical portion 231b.

Figure 11:
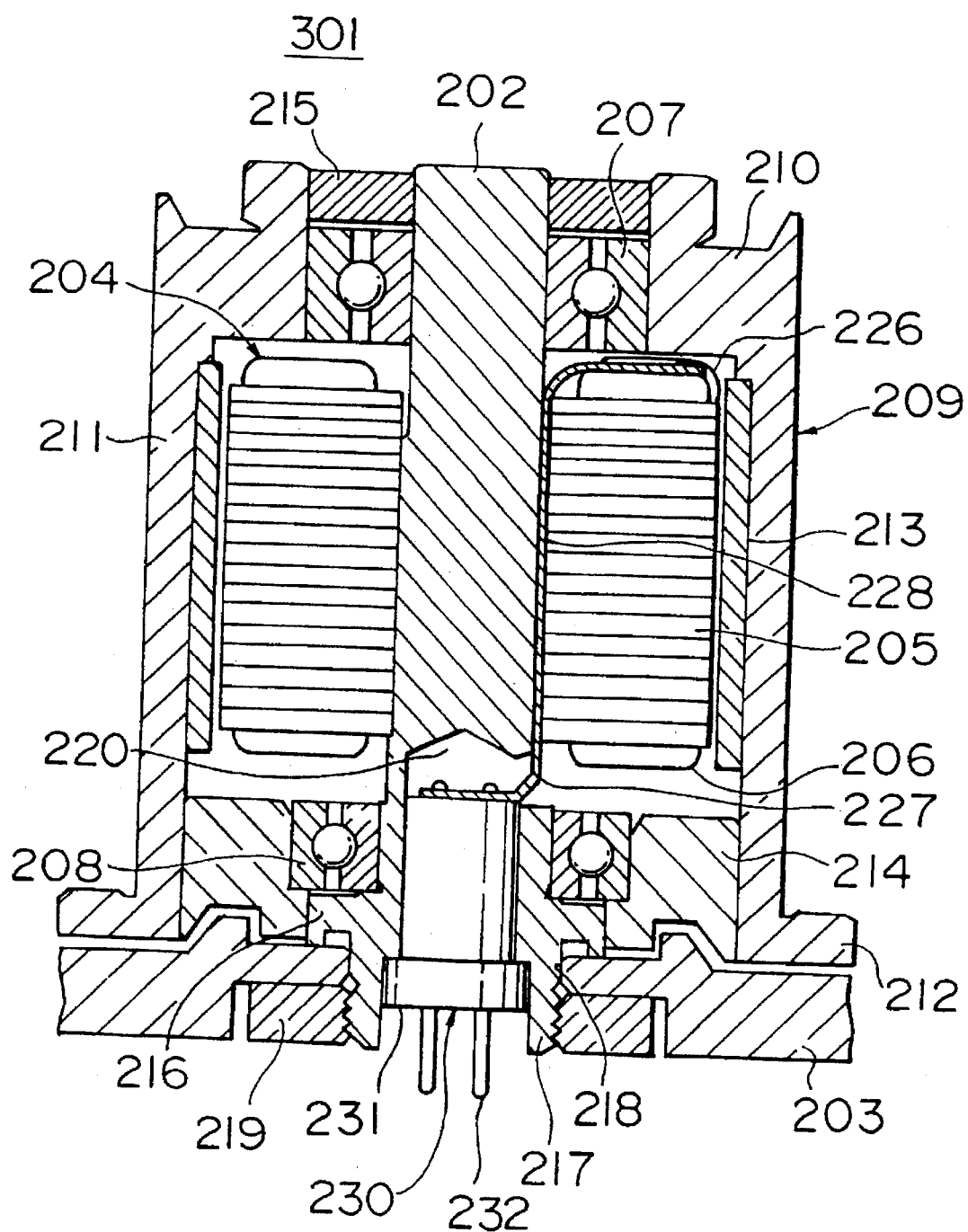
FIG. 11 is a cross sectional view of a fifth embodiment of a spindle motor according to the present invention.

An explanation will further be given of a fourth embodiment of a spindle motor according to the present invention with reference to FIG. 11. The substantially same components as those shown in FIGS. 8–10 are designated by like reference numerals, and an explanation thereof will thus be omitted.

A spindle motor 301 shown in FIG. 11 is constructed as follows. The connector 230 is fit into the through-hole 220 provided at the bottom end of the stationary shaft 202. The flexible circuit printed board 227 connected to the connector 230 is guided onto the top surface of the stator 204 on which a lead wire 226 drawn from the coil 205 is connected to the printed board 227. This connecting operation will specifically be explained in more details. A clearance 228 is formed at the central portion of the stationary shaft 202 so as to be placed at least to correspond to the stator 204. The band-like printed board 227 is connected and supported at one end to/by the connector 230 and is led at the other end to the outer periphery of the shaft 202 from the upper portion of the through-hole 220 so as to be guided upward through the clearance 228. Afterwards, the stator 204 is fit around the stationary shaft 202 from above so that the printed board 227 can be held between the clearance 228 and the internal surface of the stator core 206. The printed board 227 is connected at one end to the connector 230 as described above, and is led at the other end onto the top surface of the stator 204 from the clearance 228 and is held by the top surface of the coil 205 of the stator 204 by such means of bonding. The wire lead 226 from the coil 205 is then soldered to the other end of the printed board 227 from above.

The spindle motor 301 shown in the fourth embodiment offers the particular following advantages. The connecting operation of the wire lead 226 drawn from the coil 205 to the flexible circuit printed board 227 can be performed from the top surface of the stator 204 which has been fit around the stationary shaft 202, thereby extremely enhancing easy connecting operation.

Having described specific embodiments of a spindle motor according to the present invention, it is to be understood that the invention is not limited to the specific embodiments and that various changes and modifications may be made without departing from the spirit and the scope of the invention.

What is claimed is:

1. A spindle motor comprising:

a stationary shaft;

a rotor hub rotatably supported by said stationary shaft via a bearing;

a rotor magnet fixed to the internal surface of said rotor hub; and a stator arranged to oppose said rotor magnet, said stator including a stator core and a coil wound around said core and fixed around substantially a middle portion of said stationary shaft, said stationary shaft including a mounting portion for allowing said motor to be mounted on a base member and a through-hole extending from one end of said mounting portion at least to a middle portion of said stationary shaft, said through-hole being open in the vicinity of said stator, a connector fit into said through-hole adjacent said mounting portion, at least one wire lead from said coil directed to and passed through said through-hole and electrically connected to said connector, said connector comprising an insulating connector body and a conductive pin molded into said connector body, said connector body being provided with a hole along the axis of said stationary shaft, and said wire lead in said through-hole passing through said connector hole to a mating surface on said connector, wherein said mating surface has a groove with the forward end of said wire lead connected to said pin within said groove.

2. A spindle motor according to claim 1, wherein said mounting portion is placed at a base end of said stationary shaft, and said stationary shaft is provided with a flange-like step which is displaced toward the forward end of said stationary shaft and is larger than said mounting portion, said mounting portion having a male screw thread formed therearound in a mounting hole being provided for said base member and, a nut screwed on to said mounting portion.

3. A spindle motor according to claim 2, wherein a recess is formed on the surface of said step adjacent to said mounting portion, and wherein a sealing member is disposed in said recess so as to hermetically seal the space between said step and said base member.

4. A spindle motor comprising a stationary shaft having a mounting portion for mounting said motor on a base member, said mounting portion including an inner bore open to the outside of the motor, a rotor hub rotatably mounted on said stationary shaft via a bearing, a rotor magnet fixed to the interior of said rotor hub, a flexible printed circuit board having a plurality of electrically conductive lines, a stator disposed to oppose said rotor magnet and including a stator core and coils wound around said stator core, a wire lead from each of the coils to said flexible printed circuit board, a reinforcing plate attached to said flexible circuit printed board, an o-ring fixed on the outer periphery of said mounting portion of said stationary shaft and hermetically sealing the space between said base member and said flexible printed circuit board, a connector having a body made of insulating material and a plurality of connector pins supported by the connector body to extend therethrough with upper and lower end portions of said pins being exposed outside of the connector body; wherein, said connector body being fixed in said inner bore of said mounting portion of said stationary shaft, said wire lead and upper end portions of said plurality of connector pins being electrically connected with each other through said flexible printed circuit board, said reinforcing plate supporting said flexible printed circuit board from the upper side in the axial direction and said o-ring being in contact with said flexible printed circuit board and supporting it from the lower side in the axial direction whereby said flexible printed circuit board is sandwiched therebetween and extends horizontally at the level of the upper end surface of said connector, and said stationary shaft being provided with a cutout which extends radially from an inner surface of said inner bore of said mounting portion to the outer end portion of said stationary shaft to receive said flexible printed circuit board.

5. A spindle motor according to claim 4, wherein said flexible printed circuit board has an arched shape portion in which said electrically conductive lines are connected to said wire leads and the diameter of which is substantially equal to the outside diameter of said stator, said arched shape portion being disposed in the vicinity of said stator in the axial direction.

6. A spindle motor according to claim 4, wherein said flexible printed circuit board is formed substantially in an E-shape with an arc shaped portion, and wherein the outside diameter of said flexible printed circuit board is substantially equal to the outside diameter of said stator; said flexible printed circuit board being disposed in the vicinity of said stator in the axial direction.

7. A spindle motor according to claim 4, wherein said flexible printed circuit board has an arc shaped portion which is of a substantially semicircular shape and which is disposed along with the outside diameter of said stator with said flexible printed circuit board disposed in the vicinity of said stator in the axial direction.

8. A spindle motor comprising:

a base plate a stationary shaft fixedly mounted on the base plate with its end portion extending through the base plate, said shaft having an inner bore formed within the end portion and opening to the outside Of the motor, said end portion being formed with a cutout extending axially;

a stator fixedly mounted on the stationary shaft and having coils from which wire leads are derived;

a connector having a body of insulating material and connector pins extending substantially axially through the connector body, said connector body being fixedly received in the inner bore;

a flexible circuit board extending radially through said end portion cutout and having electrically conductive lines which are connected with the pins of the connector at one end and to the wire lead at the other end; and an O-ring for holding the flexible circuit board against the stationary shaft.

9. A spindle motor according to claim 8, further comprising a reinforcing member, and wherein said stationary shaft has a disk like portion having an end plane against which said reinforcing member is abutted by the O-ring with the flexible circuit board being sandwiched between said O-ring and the reinforcing member.

10. A spindle motor according to claim 9, wherein said coils of the stator are circumaxially arranged around the stationary shaft and said other ends of the electrically conductive lines are disposed respectively at positions corresponding to the coils.

* * * * *